March 22, 1966 J. HALLER 3,241,893
CHAMBERED SELF-LUBRICATING BEARING
Filed March 9, 1962 2 Sheets-Sheet 1
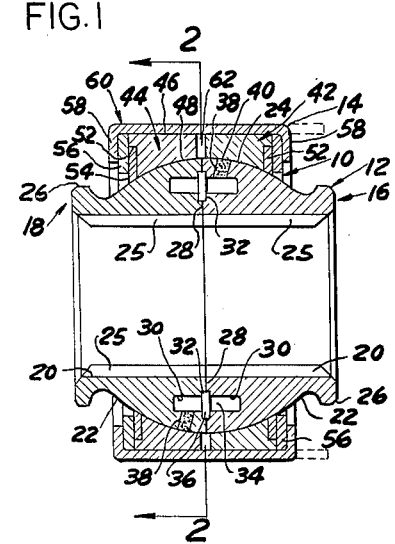
FIG.1
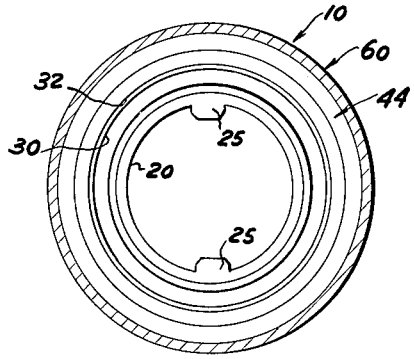
FIG.2
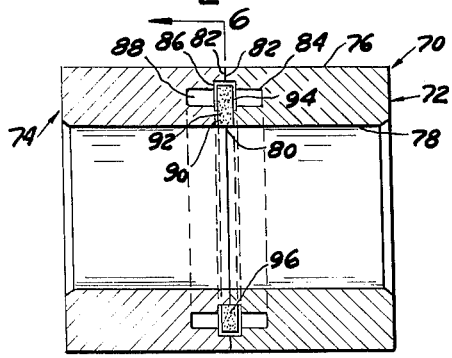
FIG.5
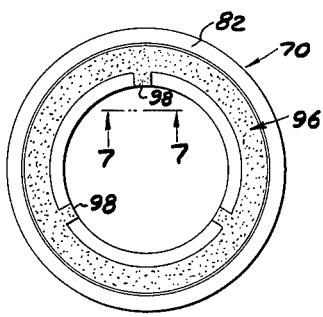
FIG.6
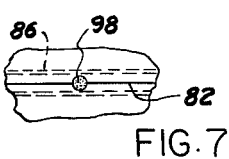
FIG.7
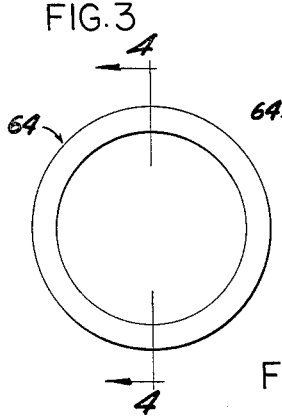
FIG.3
FIG.4
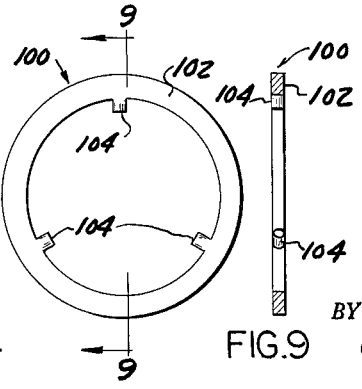
FIG.8
FIG.9
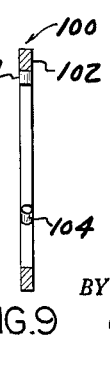
INVENTOR.
JOHN HALLER.
BY Barthel & Bugbee
ATTORNEYS.

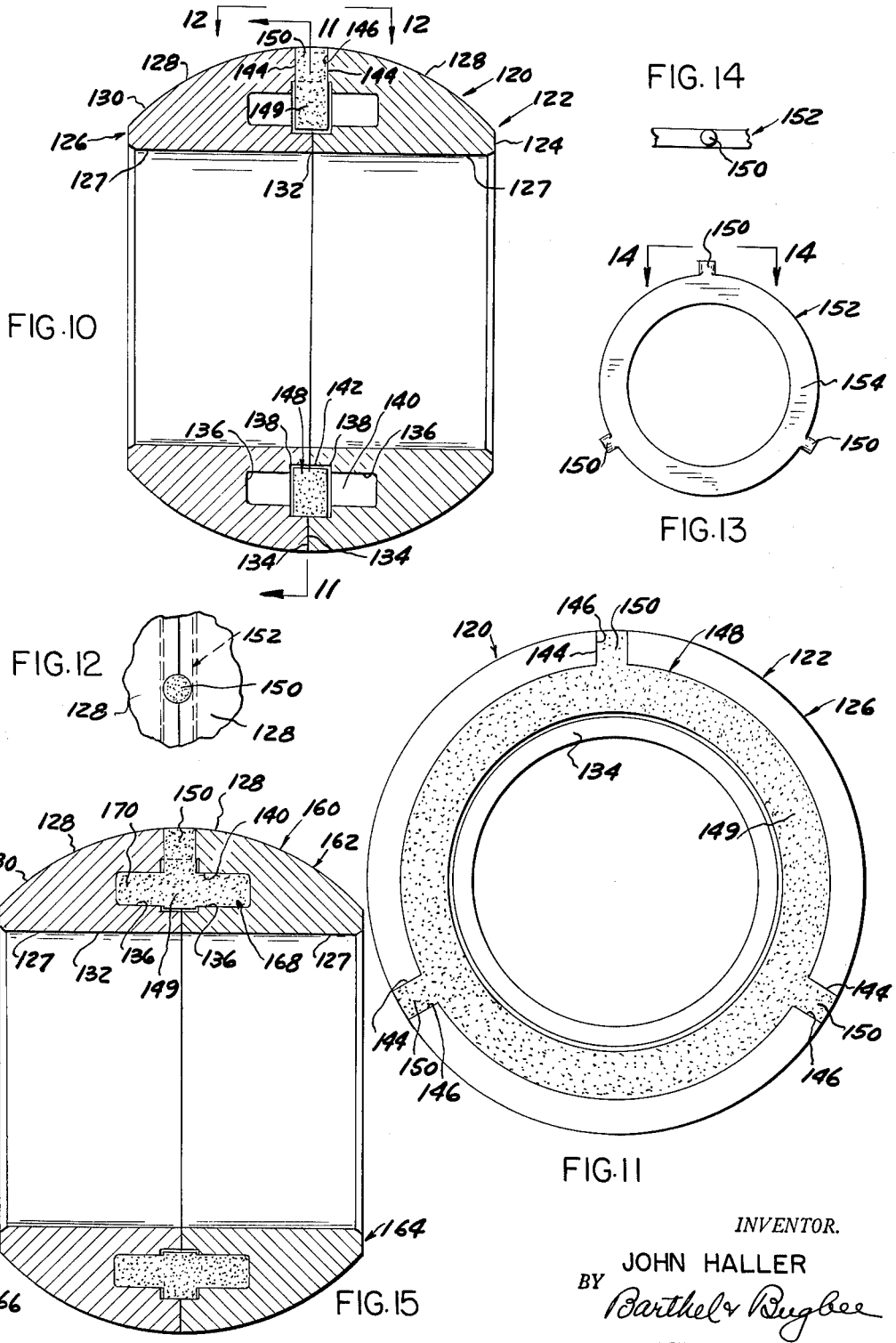

United States Patent Office 3,241,893
Patented Mar. 22, 1966

3,241,893
CHAMBERED SELF-LUBRICATING BEARING
John Haller, Northville, Mich., assignor, by mesne assignments, to Federal-Mogul-Bower Bearings, Inc., Detroit, Mich., a corporation of Michigan
Filed Mar. 9, 1962, Ser. No. 178,701
6 Claims. (Cl. 308—121)

This invention relates to bearings and, in particular, to self-lubricating bearings having lubricant wells or chambers therein.

One object of this invention is to provide an improved chambered self-lubricating bearing and process of making the same, capable of sustaining heavier loads without fracturing, than has been possible with prior self-lubricating bearings composed of sintered powdered material containing lubricant chambers.

Another object is to provide a self-lubricating bearing and process of the foregoing character wherein the bearing part containing the lubricant well or chamber is composed of two halves of solid material, such as solid steel, each containing approximately half of the lubricant chamber, with the halves united with one another along junction faces, such as by brazing, thereby securing the right-hand and left-hand components to one another while at the same time sealing their interface against leakage of lubricant at an undesired location.

Another object is to provide a chambered self-lubricating bearing and process of the foregoing character wherein the opposite bearing halves containing the lubricant chamber are secured to one another by brazing material contained in an annular porous intermediate member of sintered powdered material which, upon being subjected to a brazing heat, flows out of the pores of the sintered powdered material, such as sintered powdered iron into the interface between the opposite bearing halves, uniting the halves at the interface and leaving an annular porous structure between the two halves which absorbs lubricant from the lubricant chamber and delivers it with a capillary or wick action through porous lugs projecting to the bearing surface to be lubricated, thereby metering the delivery of lubricant to that surface.

Another object is to provide a chambered self-lubricating bearing and process as set forth in the object immediately preceding but modified so that the annular porous structure includes extensions thereof projecting laterally into the opposite halves of the lubricant chamber, thereby causing the porous structure to contain the lubricant as well as to feed it to the bearing surface.

Another object is to provide a chambered self-lubricating bearing and process of the foregoing character wherein the annular brazing member, whether solely of brazing material or of sintered powdered metal with pores containing the brazing material, also serves as a pilot member for accurately aligning the bearing halves prior to the carrying out of the brazing step of the operation, the oppositely-facing annular grooves in the opposite bearing halves forming the lubricant chamber halves having annular counterbores receiving the brazing member in piloting relationship so as to accurately align the bearing halves before brazing and to maintain that alignment until brazing has been completed.

Other objects and advantages of the invention will become apparent during the course of the following description of the accompanying drawings, wherein:

FIGURE 1 is a central longitudinal section through a chambered self-lubricating bearing of the self-aligning type, according to one form of the invention, showing the positions of the parts after assembly, wherein the opposite halves of the inner components have been united by means of a solid intermediate member of brazing metal which has melted and disappeared into the interface junction between the opposite bearing halves, leaving an open lubricant chamber therebetween;

FIGURE 2 is a central vertical cross-section taken along the line 2—2 in FIGURE 1;

FIGURE 3 is a front elevation of the intermediate member used in making the bearing of FIGURES 1 and 2;

FIGURE 4 is a central vertical section taken along the line 4—4 in FIGURE 3;

FIGURE 5 is a central longitudinal section through a chambered self-lubricating bearing of the sleeve type, according to another form of the invention, having its opposite halves united by brazing from brazing material contained in a sintered porous intermediate member from which the brazing material has escaped into the interface junction between the opposite bearing halves, leaving the porous intermediate member to receive the lubricant from the lubricant chamber and deliver it to the internal internal bearing bore through inwardly-projecting lugs of porous sintered powdered material;

FIGURE 6 is a central vertical cross-section taken along the line 6—6 in FIGURE 5;

FIGURE 7 is a fragmentary bottom plan view of a portion of the bearing of FIGURES 5 and 6, looking upward within the bearing bore toward one of the porous lugs along the line 7—7 in FIGURE 6;

FIGURE 8 is a front elevation of the sintered porous intermediate member filled with brazing material and used in uniting the opposite halves of the inner bearing components of FIGURES 5, 6 and 7;

FIGURE 9 is a central vertical section through the intermediate brazing member shown in FIGURE 8, taken along the line 9—9 therein;

FIGURE 10 is a central vertical longitudinal section through the inner component of a chambered self-lubricating bearing of a self-aligning type, according to a further form of the invention, also containing a porous sintered powdered metal aligning and lubricant feeding ring which prior to brazing contained the brazing material;

FIGURE 11 is a central vertical cross-section taken along the line 11—11 in FIGURE 10;

FIGURE 12 is a fragmentary top plan view looking in the direction of the line 12—12 in FIGURE 10;

FIGURE 13 is a side elevation, on a reduced scale, of the porous annular intermediate member employed in the bearing of FIGURES 10, 11 and 12, before brazing and with the pores filled with brazing metal;

FIGURE 14 is a fragmentary top plan view looking in the direction of the line 14—14 in FIGURE 13; and FIGURE 15 is a central longitudinal section through a still further form of the invention constituting a modification of the bearing component shown in FIGURE 10, wherein the porous annular intermediate member between the two bearing halves extends laterally into the opposite halves of the lubricant chamber thereof.

In U.S. Patent No. 2,625,452 issued January 13, 1953 for Porous Bearing with Lubricant Reservoir Therein, the present inventor provided a chambered self-lubricating bearing of sintered powdered metal or the like containing a lubricant chamber. This chamber was formed by a process disclosed and claimed in U.S. Patent No. 2,695,230 issued November 23, 1954 for Powdered Metal Article and Process of Making the Same, to the present inventor. In brief, the chamber was formed by means of an annular core of lower melting metal inserted in the powdered metal compact or briquette during pressing. Upon sintering this assembly, the core melted and infiltrated the pores of the sintered powdered metal structure surrounding it, leaving a wholly-enclosed void which formed a lubricant chamber. This chambered self-lubricating bearing of the above patent has been highly successful commercially in providing a bearing which has a much longer life than the ordinary sintered powdered metal bearing without a lubricant chamber.

Certain heavy duty bearing installations, however, require bearings which will sustain a heavier load without fracturing than is possible with sintered powdered metal components. The present invention provides a bearing, and process of making the same, wherein one of the bearing races is composed of solid bearing metal, such as bearing steel, bronze or the like containing a lubricant chamber yet capable of sustaining excessively heavy loads beyond the capability of chambered sintered powdered metal bearings, yet providing automatic feeding of lubricant from the lubricant chamber to the bearing surface for a long life without the need for supplying additional lubricant thereto or performing other maintenance service thereon.

Referring to the drawings in detail, FIGURES 1 and 2 show a chambered self-lubricating bearing, generally designated 10, according to one form of the invention as consisting generally of a compound inner component or inner race 12 rotatably and rockably mounted within a compound outer component or outer race 14 so that the two components 12 and 14 are rockable and thus self-aligning relatively to one another. It will be seen below, however, that the advantages of the invention are not confined to bearings of the self-aligning type but also extend to bearings of the non-self-aligning type, such as that shown in FIGURES 5, 6 and 7.

The inner component or inner race 12 of the bearing 10 (FIGURE 1) consists of two oppositely-facing halves 16 and 18 preferably made of bearing metal such as steel, brone or the like, and of generally similar construction, hence for brevity these parts are designated with the same reference numerals. Each inner race half 16 or 18 is roughly tubular with a generally cylindrical bore 20 and an external spherical surface 22 extending approximately through a 30 degree angle from its center of curvature, the two oppositely-facing half surfaces 22 thus forming an annular zone or complete bearing surface 24 of spherical external curvature. The bores 20 are optionally provided with axial or longitudinally-extending ribs or key portions 25 aligned with one another so as to enter corresponding longitudinal or axial grooves or keyways in the shaft (not shown) upon which the inner component 12 is mounted in a machine.

Each inner race half 16 or 18 (FIGURE 1) is also optionally provided with an annular end flange or enlargement 26, and also with a flat radial inner face 28 which fits snugly against the counterpart face 28 of the opposite race half. Extending inward from each inner face 28 is an annular groove 30 with an annular counterbore 32 at its mouth. Collectively the two grooves 30 and their countergrooves 32 form an annular lubricant chamber 34 with an annular central enlargement 36 when the inner faces 28 of the inner bearing component halves 16 and 18 are secured in end-to-end abutment with one another. Each of the inner race halves 16 and 18 is additionally provided with a hole 38 extending outwardly from the chamber 34 and terminating at the bearing surface 22. Each of the holes 38 contains a porous wick 40 which by capillary attraction conveys lubricant, such as oil, from the lubricant chamber 34 to the complete bearing surface 24.

The inner bearing race 12 is rockably mounted within a pair of outer race halves 42 and 44 (FIGURE 1) also of similar construction to one another but facing in opposite directions, hence for brevity having their parts designated with the same reference numerals. Each outer race half 42 or 44 is preferably formed either of sintered powdered metal or of solid bearing metal of annular shape with an outer preferably cylindrical surface 46 and an inner spherical surface 48 of substantially the same curvature as the outer bearing surface 24 of the inner bearing race 12. Each outer bearing race half 42 or 44 also has a substantially radial end surface 50 containing an annular counterbore 52 in which is seated a sealing ring or gasket 54 of yielding material, such as synthetic rubber or resilient synthetic plastic. Each gasket 54 is held within its counterbore 52 in wiping oil-retaining engagement with the convex spherical bearing surface 24 of the inner bearing component or race 12 by an annular retaining ring or washer 56. The latter is provided with a sufficiently large central hole to provide adequate clearance between it and the bearing surface 24 to prevent contact and to permit some slight flexing of the inner edge of the sealing gasket 54. The two retaining rings 56 are in turn held in assembly by inwardly-turned radial flanges 58 on the opposite ends of an annular housing 60. As described below, the housing 60 is initially formed with a flange 58 at one end only and assembled over the parts 42, 44, 54 and 56 (FIGURE 1) after which the remaining flange 58 is produced by a spinning operation. A gap 62 is left between the outer bearing components or race halves 42 and 44 in which small amounts of lubricant can collect.

In the manufacture of the bearing 10 of FIGURE 1, let it be assumed that the inner and outer bearing race halves 16, 18 and 42, 44 have been formed with the shapes described above. To unite the inner race halves 16 and 18 along their radial faces 28, an intermediate member 64 of brazing material, such as copper or brass, is prepared for substantially the same dimensions as the annular enlargement 36 formed by the two opposing countergrooves 32 so as to fit therein while permitting the inner faces 28 to engage one another. The annular intermediate brazing member 64 thus acts initially as a pilot member to align the inner bearing race halves 16 and 18 accurately with one another so that their individual spherical convex outer surfaces 22 will merge smoothly with one another at their interfaces 28.

While the halves 16 and 18 are assembled in the manner, they are subjected to a brazing heat in a suitable furnace sufficient to melt the intermediate member 64 and cause the brazing material of which it is composed to flow between the abutting faces 28 of the halves 16 and 18, uniting them to one another by brazing. During this procedure, the melting of the intermediate member or ring 64 causes it to disappear from its initial position forming a pilot member between the two inner race halves 16 and 18, leaving the chamber 34 with its enlargement 36. The operator now fills the lubricant chamber 34 with a suitable lubricant and inserts the wicks 40 in the lubricant holes 38.

Meanwhile, the two outer race halves 42 and 44 have been prepared in the manner and of the shape described above, together with the sealing rings 54 and retaining rings 56, and the housing 60 has likewise been prepared as described above, with only one of the end flanges 58 yet formed, for example, the left-hand end flange 58 of FIGURE 1. The operator then assembles the bearing parts so that they come to rest in the positions shown in FIGURE 1. To do this, he inserts a sealing ring 54 into the annular counterbore 52 in the outer end of the left-hand outer race half 44, places a retaining ring 56 against it and slides this assembly to the right over the end flange or rib 26 at the left-hand end of the inner race 12 until the concave spherical surface 48 of the outer race 44 engages the convex spherical surface 24 of the inner race 12.

The operator now slides the open right-hand end of the housing 60 from the left over the left-hand end rib 26 of the inner race 12 until its left-hand end flange 58 engages the left-hand retaining ring 56 which in turn now engages the sealing ring 54 and outer race half 44. Through the open mouth at the right-hand end of the housing 60 he then inserts the right-and outer bearing race half 42 into which he has inserted the right-hand sealing ring 52. He then inserts the right-hand retaining ring 56.

The operator then places the thus-described assembly in a suitable conventional metal spinning apparatus (not shown) and spins the right-hand end flange 58 onto the housing 60 by working the metal inward from the dotted line axial position at the left hand end of FIGURE 1 to the solid line radial position therein. This spinning operation completes the assembly of the bearing 10 shown in FIGURES 1 and 2, after which it is ready for installation in the machine (not shown) in which it is intended to be used. Such methods of installing bearings are well-known among those skilled in the mechanical arts and are beyond the scope of the present invention.

The modified chambered self-lubricating bearing, generally designated 70, shown in FIGURES 5, 6 and 7, according to the invention consists of two similar but opposite-facing bearing halves 72 and 74 respectively, each in the form of a short sleeve or bushing of solid bearing metal, such as bearing steel, bronze or the like. The right-hand end left-hand bearing halves 72 and 74 are of such similar construction, although opposite-facing, that for brevity their parts are designated with the same reference numerals. Each bearing half 72 or 74 has substantially cylindrical external and internal surfaces 76 and 78, the latter forming the right-hand half of the bearing bore, collectively designated 80, to be lubricated. The bearing halves 72 and 74 are provided with substantially flat radial end faces 82 which fit snugly against one another. Extending inwardly from each face 82 is an annular groove 84 with an annular countergroove 86 at its mouth. Collectively, the two grooves 84 and their countergrooves 86 form an annular lubricant chamber 88 with an annular central enlargement 90 when the radial inner faces 82 of the bearing halves 72 and 74 are secured in end-to-end abutment with one another. Each bearing half 72 and 74 has oppositely-facing semi-cylindrical radial grooves 90 extending from their respective annular counter-grooves 86 to their bores 78, these in assembly forming circumferentially-spaced radial holes 92.

Mounted in the enlargement 94 formed by the two oppositely-facing countergrooves 86 is an annular intermediate member, generally designated 96, of porous sintered powdered metal, such as iron, having circumferentially-spaced porous integral lugs 98 extending inwardly therefrom (FIGURE 6) and terminating flush with the bearing bore 80. The lugs 98 are of substantially the same dimensions as the holes 92 to fit therein. The chamber 88 holds a suitable lubricant, such as lubricating oil, which during operation is conveyed by the porous annular intermediate member 96 and its spaced lugs 98 to the bearing bore 80, thus providing a metered distribution of oil thereto.

In the manufacture of the modified bearing 70 of FIGURES 5, 6 and 7, the oppositely-facing bearing sleeve or bushing halves 74 are prepared with the shaped described above and shown in FIGURES 5 and 6. The intermediate member 96 is separately prepared by conventional methods of briquetting powdered metal in a conventional briquetting press by procedures well known to those skilled in powder metallurgy. The intermediate member 96 is then sintered in the usual way to produce the porous metal ring shown in FIGURES 5 and 6, after which it is impregnated with a suitable brazing metal such as copper or brass, by immersing it in a molten bath of such metal or by bringing it into contact with such metal in a molten state. In either event, the molten brazing metal flows into the pores of the porous intermediate member 96 to fill the pores thereof and thereby form the approximately solid brazing-metal-impregnated brazing ring or preliminary intermediate member 100 shown in FIGURES 8 and 9 with a brazing-metal-impregnated annular portion 102 and brazing-metal-impregnated radial lugs 104 extending inwardly therefrom.

The operator now assembles the two bearing halves 72 and 74 as shown in FIGURE 5, with the preliminary intermediate member 100 disposed as a pilot member in the enlargement 94 formed by the two oppositely-facing countergrooves 86 with the lugs 104 seated in the holes 92 formed by the semi-cylindrical radial grooves 90, and subjects this assembly to a brazing heat. As a result of this heat, the brazing metal, being of lower melting temperature than the sintered powdered metal of the preliminary intermediate member 100, flows out of the pores thereof and enters the crack between the facing inner ends 82 of the bearing halves 72 and 74. This action brazes the bearing halves 72 and 74 to one another along their meeting faces 82, leaving the porous sintered powdered metal intermediate member 96 resulting from the flow of brazing metal out of the pores of the preliminary intermediate member 100.

The operator then fills the lubricant chamber 88 of the bearing 70 with a suitable lubricant, such as lubricating oil, in any suitable manner, such as by immersing it in an airtight tank of lubricating oil from which the air is subsequently evacuated. As a result, the vacuum produced above the level of the oil in the tank sucks the air out of the lubricant chamber or oil well 88 through the porous lugs 98, replacing it by a vacuum. When air is reintroduced into the tank above the oil, the atmospheric pressure forces lubricant through the pores in the porous lugs 98 and remainder of the intermediate member 96 into the lubricant chamber 88.

In the use of the self-lubricating bearing 70 of FIGURES 5 to 7 inclusive, the bearing 70 is mounted in any suitable way, such as in a bearing bracket or hanger or in a casing or housing, depending upon the particular machine or installation, and the shaft which is to be rotatably supported is inserted through the bearing bore 78. During operation, the bearing bore is lubricated by oil seeping through the pores of the sintered powdered metal intermediate member 96, with a wick action performed by the porous lugs 98.

The further modified chambered self-lubricating bearing, generally designated 120, shown in FIGURES 10 to 14 inclusive includes a novel chambered inner race, generally designated 122, mounted in an outer race (not shown) similar to the outer race 14 shown in FIGURES 1 and 2, hence for clarity of showing it is omitted from FIGURES 10 and 11. The inner race 122, like the inner race 12 of the bearing 10 of FIGURES 1 and 2 is of the self-aligning type and consists of two oppositely-facing halves 124 and 126 preferably made of bearing metal, such as steel, bronze or the like, and likewise of generally similar construction. Accordingly, for brevity, the parts of the two opposite halves 122 and 124 are designated with corresponding reference numerals. Each inner race half 122 or 124 is roughly tubular with a generally cylindrical bore 127 and an external spherical surface 128 extending approximately through a suitable angle, such as the 45 degree angle from its center of curvature shown in FIGURE 10, the oppositely-facing convex surfaces 128 thus subtending an angle of approximately 90 degrees and forming a complete outer bearing surface 130 of spherical curvature. Similarly, the two bores 127 align to form a single bore 132. The two bearing halves 124 and 126 have substantially flat radial inner faces 134 which fit snugly against one another.

Extending inward from each inner face 134 of each bearing race half 124 and 126 is an annular groove 136, the mouth of which contains an annular countergroove 138. In assembly, and collectively, the two grooves 136 and countergroove 138 form an annular lubricant chamber 140 containing an annular central enlargement 142. Each of the countergrooves 138 also contains a plurality of outwardly-projecting semi-cylindrical grooves 144 extending therefrom to their respective outer spherical surfaces 128, these grooves 144 in assembly forming circumferentially-spaced outwardly-projecting preferably radial holes 146.

Mounted in the annular central enlargement 142 formed by the two oppositely-facing countergrooves 138 is an annular intermediate member, generally designated 148, of porous sintered powdered metal, such as iron, having an annular central portion 149 with circumferentially-spaced integral porous lugs 150 corresponding to the circumferentially-spaced holes 146 and similarly extending out to the spherical external surface 130 of the inner race 122. The lugs 150 are of substantially the same dimensions as the holes 146 in order to fit the latter.

In the manufacture of the further modified chambered self-lubricating bearing 120 of FIGURES 10 to 14 inclusive, the intermediate member 148 is prepared by conventional procedure in briquetting powdered metal in a conventional briquetting press, as is well known to those skilled in the powder metallurgy art, the usual sintering producing the intermediate member 148. The porous powdered metal annular intermediate member 148 is then impregnated with a suitable brazing metal, such as copper or brass, by filling the pores thereof with molten brazing metal in the manner described above. This forms the temporary or preliminary intermediate member 152 of FIGURES 13 and 14 which consists of the approximately annular brazing-metal-impregnated portion 154 having brazing-metal-impregnated radial lugs 156 extending outwardly therefrom.

The operator now places the two bearing halves 124 and 126 face-to-face along their inner surfaces 134, with the brazing-metal-impregnated preliminary intermediate member 152 between them in the central annular enlarged space 142 and with the lugs 156 disposed in the holes 146. The assembly thus made is subjected to a brazing heat, whereupon the lower melting brazing metal flows out of the pores of the preliminary intermediate member 152 and enters the crack between the facing inner ends 134 of the bearing halves 124 and 126. This action brazes the bearing halves 124 and 126 to one another along their meeting faces 134, leaving the porous sintered powdered metal intermediate member 148 resulting from the flow of brazing metal out of the pores of the preliminary intermediate member 100. The operator then fills the lubricant chamber 140 of the bearing race 122 with a suitable lubricant, such as lubricating oil, in any suitable manner, such as has been described above in connection with the bearing 70. The bearing race 122, thus charged with lubricant, is formed into the complete self-aligning bearing 120 by combining it with an outer race and housing (not shown) similar to the outer race 14 with its housing 60, in the manner described above in connection with the manufacture of the chambered self-lubricating bearing 10 of FIGURE 1.

The operation of the chambered self-lubricating bearing 120 is generally similar to that described above in connection with the bearing 10 of FIGURES 1 and 2, except that the wicks of the latter are absent, and the porous lugs 159 of the intermediate member 148 themselves serve as wicks to distribute the lubricant from the intermediate member 148 which in turn receives it by capillarity from the intermediate member 148 which in turn receives it by capillarity from the lubricant chamber 140. The oil thus conveyed by the force of capillary attraction reaches the spherical surface 130 of the inner race 122 and lubricates it during its subsequent operation when, for example, the shaft is inserted in the bore 132.

The still further modified chambered self-lubricating bearing, generally designated 160, shown in FIGURE 15 includes a slightly modified chambered inner race, generally designated 162, mounted in an outer race (not shown) similar to the outer race 14 shown in FIGURES 1 and 2. The inner race 162, like the inner race 122 of the bearing 120 of FIGURES 10 and 11, consists of two oppositely-facing united halves 164 and 166 similar to the bearing halves 124 and 126 of FIGURE 10 and consequently having their parts designated with the same reference numerals. These bearing halves 164 and 166, however, are equipped with a slightly modified intermediate member, generally designated 168, which is similar to the intermediate member 148 of the bearing race 122 except that it has additional annular porous sintered powdered metal flanges 170 extending laterally from the annular central portion 149 into the annular grooves 136 so as to partially or fully fill the grooves 136. As a consequence, the lubricant chamber 140 is substantially filled with the porous cellular structure of the intermediate member 168, and the outwardly-projecting lugs 150 serve to convey lubricant from the pores of the portions 170 and 149 to the spherical bearing surface 130 in the manner described above in connection with the operation of the bearing 120 of FIGURES 10 and 11.

The intermediate member 168 is prepared from powdered metal, sintered, and impregnated with copper, brass or other suitable brazing metal, in the manner described in connection with the bearing 120 of FIGURE 10. Assembly and brazing of the bearing halves 164 and 166 to one another are also carried out in the manner described above, with the intermediate member 168 similarly serving as a pilot member to accurately align the halves 164 and 166. The manner of subsequently charging the lubricant chamber 140 and the porous sintered powdered metal intermediate member 168 is also similar to that described above, as is the installation of the outer race 14. The mode of operation is likewise similar to that of the bearing 120 of FIGURES 10 and 11, hence requires no repetition.

What I claim is:

1. A chambered self-lubricating bearing, comprising first and second component bearing bodies of solid metal disposed in end-to-end coaxial relationship with one another with their adjacent end surfaces disposed in close proximity to one another and collectively defining a composite bearing body,
   one of said component bodies having a bearing surface thereon to be lubricated,
   one of said component bodies having a lubricant recess therein extending inwardly away from its respective adjacent end surface and the other component body forming a closure for said recess,
   means securing said component bodies to one another at said adjacent end surfaces,
   and a passageway with a porous lubricant-conducting element of sintered powdered metal therein for conveying lubricant extending from said recess to said bearing surface.

2. A chambered self-lubricating bearing, according to claim 1, wherein a member of porous sintered powdered metal is disposed in said recess, and wherein said lubricant conducting element comprises a projection connected to said porous sintered powdered metal member and extending from said member through said passageway to said bearing surface.

3. A chambered self-lubricating bearing, comprising first and second component bearing bodies of solid metal disposed in end-to-end coaxial relationship with one another with their adjacent end surfaces disposed in close proximity to one another and collectively defining a composite bearing body,
   said component bodies having a bearing surface thereon to be lubricated and having lubricant recesses therein extending inwardly thereof away from said adjacent end surfaces and collectively defining a lubricant chamber disposed between said component bodies,
   means securing said component bodies to one another at said adjacent end surfaces,
   and a passageway with a porous lubricant-conducting element of sintered powdered metal therein for conveying lubricant extending from said chamber to said bearing surface.

4. A chambered self-lubricating bearing, according to claim 3, wherein a member of porous sintered powdered metal is disposed in said chamber, and wherein said lubricant conducting element comprises a projection connected to said porous sintered powdered metal member and extending from said member through said passageway to said bearing surface.

5. A process of making a chambered self-lubricating bearing, including
   preparing first and second component bearing bodies from solid metal with matingly-configured transversely-disposed end surfaces,
   forming a bearing surface to be lubricated on one of said bodies,
   forming a lubricant recess in one of said bodies with a lubricant passageway leading therefrom to said bearing surface,
   placing the other component body in end-to-end relationship to said one body with the matingly-configured end surfaces thereof adjacent one another,
   securing said component bodies to one another at said adjacent end surfaces including interposing a porous structure containing a uniting material between said adjacent end surfaces of said component bodies, causing said uniting material to flow into adhering engagement with said adjacent end surfaces,
   and filling said recess with lubricant.

6. A process of making a chambered self-lubricating bearing, including
   preparing first and second component bearing bodies with matingly-configured transversely-disposed end surfaces,
   forming a bearing surface to be lubricated on one of said bodies,
   forming a lubricant recess in one of said bodies with a lubricant passageway leading therefrom to said bearing surface,
   placing the other component body in end-to-end relationship with said body with the matingly-configured end surfaces thereof adjacent one another,
   securing said component bodies to one another at said adjacent end surfaces,
      said step of securing said component bodies to one another including interposing a porous structure containing a uniting material between said adjacent end surfaces of said component bodies,
         said porous structure having a projection thereof extending through said passageway,
   causing said uniting material to flow into adhering engagement with said adjacent end surfaces,
   and filling said recess with lubricant.

References Cited by the Examiner

UNITED STATES PATENTS

| 1,856,304 | 5/1932 | Whiteley | 308—240 |
| 2,479,791 | 8/1949 | Strunk | 308—72 |
| 2,625,452 | 1/1953 | Haller | 308—240 |
| 2,083,688 | 6/1957 | Clements | 308—36.1 |

DON A. WAITE, *Primary Examiner.*

MILTON KAUFMAN, ROBERT C. RIORDON,
*Examiners.*